United States Patent Office 3,661,820
Patented May 9, 1972

3,661,820
COATING COMPOSITION FOR PREVENTING CARBURIZATION OF STEEL PARTS WITH SUBSEQUENT WATER WASH-OFF CAPACITY
Robert W. Foreman, Bloomfield Hills, and Jon S. Pontius, Ypsilanti, Mich., assignors to Park Chemical Company
No Drawing. Filed July 15, 1970, Ser. No. 55,225
Int. Cl. C09d 5/02; C21d 1/70; C23c 9/06
U.S. Cl. 260—22 A
8 Claims

ABSTRACT OF THE DISCLOSURE

A composition for use in forming a coating on selected surfaces of steel parts to selectively prevent carburization thereof in gas carburizing, pack carburizing, and carbonitriding mediums, said composition being basically comprised of a water reducible or water soluble organic resin, a boron material such as boric acid, and a carrier fluid of water.

BACKGROUND OF THE INVENTION

This invention broadly relates to a carburizing "stop-off" composition. More specifically this invention relates to a composition and method suitable for forming a coating on steel surfaces to prevent carburization thereof in gas carburizing, pack carburizing, and carbonitriding mediums.

It is a primary object of this invention to provide a new water washable carburizing stop-off composition which composition may be removed from steel parts after carburizing heat treatment thereof by water washing.

Another object of the invention is to provide such a coating which will air dry in preferably one hour or less time and which coating will exhibit proper adherence to the metal when dried, as well as exhibit a proper film hardness, such that the coating will not flake or fall off either before or during the carburizing treatment.

Another object of the present invention is to provide such a coating composition which will exhibit a satisfactory shelf life.

Another and very important object of the invention is to provide a stop-off coating composition which is non-flammable and yet which coating composition will exhibit a proper homogeneity and subsequent film forming capabiilty when applied as a coating.

Another object of the present invention is to provide a new stop-off coating composition which exhibits satisfactory paintability and leveling properties when applied to steel parts, that is, such that thin spots are not left in the applied coated film which thin spots might act to follow the carburization medium to penetrate the stop-off composition.

Another object of the present invention is to provide a stop-off coating composition which is a one package product or composition dilutable with water when it is desired to thin the composition and yet which composition remains essentially homogeneous after being diluted with water.

Another object of the present invention is to provide a new stop-off coating composition which exhibits good leveling action when brushed onto a steel part.

Another object of the present invention is to provide a coating composition which when applied to the parts will prevent carburization thereof at temperatures in the range of approximately 1500–1800° F.

Other objects, features and advantages of the present invention will become apparent from the subsequent description and the appended claims.

SUMMARY OF THE INVENTION

Briefly stated, the present invention comprises a composition suitable for use in forming a coating on metal surfaces to selectively prevent carburization thereof in gas carburizing, pack carburizing, and carbonitriding mediums, said composition comprising in weight percent, (a) about 6% to about 70% of at least one boron material selected from the group consisting of boric acid, boron oxide, or borax, (b) about 3% to about 65% on an active resin basis of water reducible organic resin, said resin having a set time of less than about 8 hours, and a cure temperature from about 32° to about 120° F., (c) about 2% to about 60% of water as a carrier fluid for the composition (d) zero to about 12% of a nonionic surfactant material, (e) zero to about 20% of thickening agent, and (f) zero to about 25% of drying agent.

From a method aspect, briefly stated, the present invention comprises a method of using a coating composition to selectively prevent carburization of metal surfaces in gas carburizing, pack carburizing, and carbonitriding mediums, said method comprising the steps of, applying the coating composition to the metal surface, said composition comprising in weight percent, (a) about 6% to about 70% of at least one boron material selected from the group consisting of boric acid, boron oxide, or borax, (b) about 3% to about 65% on an active resin basis of water reducible organic resin, said resin having a set time of less than about 8 hours, and a cure temperature from about 32° to about 120° F., (c) about 2% to about 60% of water as a carrier fluid for the composition, (d) zero to about 12% of a nonionic surfactant material, (e) zero to about 20% of thickening agent, and (f) zero to about 25% of drying agent, drying the coating composition on the metal surface, and introducing the metal into a carburizing medium.

DESCRIPTION

Generally, the coating composition of this invention is applied by first cleaning the steel or metal parts such that they are free from oil and grease, either by heating to approximately 550–650° in a furnace or by treatment with any standard degreaser or alkaline metal cleaner. Next the composition of this invention may be applied, typically by brushing, at room temperature using two coats if desired. The first coat is allowed to dry before the second coat is applied. The composition may be applied as is or the user of the composition for particular circumstances may desire to thin the composition to a particular desired consistency and if thinning of the composition is necessary this may be done by diluting with water. Generally a soft flat brush should be used to apply the composition in order to avoid air bubbles. Lastly, the coating composition should be allowed to thoroughly dry before the parts are subjected to carburizing mediums. After the parts have been subjected to the carburizing treatment the residue or coating composition which remains on the parts in accordance with the invention may be easily removed in hot water, or hot mild alkaline cleaner after the carburizing or heat treatment is finished. All of the above is explained in greater detail with reference to this invention hereinbelow.

While it is not intended that this invention should be limited by any particular theory of operation it is believed that the coating which is formed using the composition of this invention for the purpose of selectively preventing carburization on steel parts forms a film of carbon at the working temperature (about 1700–1800° F.) of carburization or other similar heat treatments, and that this film of carbon prevents the transfer of carbon monoxide, which is the normal carburization vehicle, to and from the steel part. In order to achieve this kind of film with the composition of the invention described herein, it is believed that the organic resin operates at least partially as a carbon donor material and that the boron material operates as a fluxing agent which holds the carbon particles together to make a continuous and homogeneous film over the steel part to prevent carburization thereof as to those surfaces which are coated with the composition of this invention. A main aim of the invention was to develop a coating composition or stop-off composition which would be water soluble and thinnable to start with and which could be easily removed by washing with water after it had been used. The use of certain other compositions for this purpose had been made in the prior art such as a composition comprised of boric acid and a resin dispersed in a solvent base of xylene-toluene. However, such prior art compositions were very disadvantageous from the standpoint of being highly flammable due to the xylene-toluene solvent base used and also from the standpoint that they were difficult if not impossible to dilute or thin out upon actual usage other than by adding additional flammable solvent. Still further the shelf life of these prior art compositions was poor. Lastly, the paintability or leveling off properties of such prior art paint compositions were poor in comparison with the coating composition of the present invention. However, difficult problems were encountered in attempting to develop or arrive at the aim of this invention mentioned above in that a high number of compositions were attempted and rejected without obtaining a coating composition which possessed a proper homogeneous nature and which when applied as a film or paint coating gave the necessary film forming properties both before and during the highly severe carburizing heat treatment and yet which composition could live up to the unique capability of being able to be washed off with water after carburizing, rather than having to be scraped, ground, or sand blasted off.

The water reducible organic resin used in the invention may satisfactorily be of the type such as disclosed in the following references: U.S. Pat. No. 3,098,834; U.S. Pat. No. 3,345,313; U.S. Pat. No 3,297,605; U.S. Pat. No. 2,634,245. The disclosure from the aforementioned patents is hereby incorporated herein by reference. Preferably the water reducible organic resin used in this invention should be a water reducible polyester resin. By the term water reducible polyester resin as used herein, it is meant generally a water soluble polyester resin. By the term polyester as used herein it is intended to also include alkyd resins or drying oil resins, all of which can generally be considered to fall within the term polyester resins, as is known in in the art.

The polyester resin should be one which in after the carrier for the resin evaporates the resin is no longer water soluble and sets to a water resistant coating. The water dispersability or solubility of the resin and water is brought about by the presence of ammonia or an amine to neutralize the resin. Ammonium hydroxide can be used for this purpose or the more volatile strongly basic organic amines such as monoethyl amine, triethyl amine, and the like, may suitably be used. These may generally be termed volatile nitrogen containing agents which assist in rendering the polyester resin water reducible. In order to achieve real water solubility of the resin a co-solvent or coupling solvent is normally used; and these solvents may satisfactorily be ketones, ethers and the like; and, furthermore the coupling solvents should be water miscible.

The amount of water reducible organic resin used in the composition should broadly be within the range of about 3% to about 65% by weight, and preferably within the range of about 10% to about 40% by weight.

The boron material used in the invention should be of the type such as boric acid, boron oxide, or borax. Preferably either boric acid or boron oxide should be used.

The amount of boron material used in the composition should broadly be within the range of about 6% up to about 70% by weight, and preferably within the range of about 15% up to about 50% by weight.

The carrier fluid for the water based composition of this invention should be on a broad basis about 2% to about 60% by weight of water. On a preferred basis the water present in the composition should be within the range of about 5% to about 40% by weight.

In accordance with the inventive discovery which has been made, it has also been found that a nonionic surfactant material provides unique properties to the inventive composition described herein. By the term nonionic surfactant material as used herein it is meant to include organic derivatives such as sodium salts of high molecular weight alkyl sulfates, or sulfonates. In particular a highly suitable surfactant for purposes of this invention has been discovered and that is the material Plurafac C–17.

The amount of nonionic surfactant material used in the composition can satisfactorily vary from zero up to about 12% by weight, however, on a preferred basis the surfactant should be present in the range from about $\frac{1}{20}$% up to about 12% by weight. Best results are obtained when the surfactant is present from about $\frac{1}{20}$% up to about 6% by weight.

In accordance with the discoveries made in this invention it has also been found that a thickening agent may be used in the composition. The thickening agent used may be a material such as carboxymethylcellulose, gums, or a material such as Gantrez AN-119. Broadly the thickening agent may be present within the range of zero percent up to about 20% by weight of the composition, and preferably within the range of about $\frac{1}{20}$% to about 10% by weight.

A drying agent in accordance with the discoveries of this invention may also be present in the composition. Broadly stated the drying agent may be present from about zero percent up to about 25% by weight of the composition. On a preferred basis the drying agent should be present from about $\frac{1}{20}$% by weight up to about 25% by weight. Preferably the drying agent should be methyl alcohol which has been found to give very good results in accordance with this invention, however, the drying agent may also be selected from the group consisting of naphthenates, linoresinates, linoleates, hexates, resinates or inorganic salts of cobalt, copper, lead, manganese, zinc calcium, iron or aluminum.

Best results in accordance with the inventive composition disclosed herein are obtained when the organic resin is present within the range of about 10% to about 30% by weight; the boron material is present from about 20% to about 45% by weight; the carrier fluid is present from about 8% to about 20% by weight; the drying agent is present from about 5% to about 25% by weight; and the nonionic surfactant is present from about $\frac{1}{20}$ to about 6% by weight.

In order to further illustrate the invention, the following examples are provided. It is to be understood, however, that the examples are included for illustrative purposes and are not intended to be limiting of the scope of the invention as set forth in the subjoined claims.

| Example number | Boron material, percent | Water reducible organic resin, percent | Water, percent | Nonionic surfactant, percent | Thickening agent, percent | Drying agent, percent |
|---|---|---|---|---|---|---|
| 1 | [1] 41   | [2] 15.5 | 14   | [3] 4.5 | [4] 5   | [5] 20   |
| 2 | [1] 40.8 | [2] 16.3 | 14.7 | [3] 1.1 | [4] 5.4 | [5] 21.7 |
| 3 | [1] 12   | [2] 5    | 55   | [3] 6   | [4] 10  | [5] 22   |
| 4 | [1] 30   | [2] 3    | 10   | [3] 12  | [4] 20  | [5] 25   |

[1] Boric acid;  [2] Stepanyl 324–57;  [3] Plurafac C–17;  [4] Gantrez AN–119;  [5] Methyl alcohol.

It has also been found a color dye may also be used in the composition of this invention, and broadly stated such a color dye may be present within the range of about zero up to about 2% by weight of the composition. Any suitable color dye may be used in the composition, and those skilled in the art should be presented with no difficulty in selecting the proper type color dye for use herein.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A composition, suitable for use in forming a coating on metal surfaces to selectively prevent carburization thereof in gas carburizing, pack carburizing, and carbonitriding mediums, said composition comprising in weight percent,
    (a) about 15% to about 70% of at least one boron material selected from the group consisting of boric acid, boron oxide, or borax,
    (b) about 3% to about 65% on an active resin basis of water reducible organic resin
        said resin having a set of time less than about 8 hours, and a cure temperature from about 32° to about 120° F.,
    (c) about 2% to about 60% of water as a carrier fluid for the composition,
    (d) zero to about 12% of a nonionic surfactant material,
    (e) zero to about 20% of thickening agent, and
    (f) zero to about 25% of drying agent
        said composition exhibiting a property of being capable of being washed off with water after it is applied and used as a stop-off composition.

2. The composition of claim 1 wherein, said resin is water reducible polyester resin.

3. The composition of claim 1 wherein, said resin is present from about 10% to about 40%, said boron material is present from 15% to about 50%, said carrier fluid is present from about 5% to about 40%.

4. The composition of claim 2 wherein, said resin is present from about 10% to about 40%, said boron material is present from 15% to about 50%, said carrier fluid is present from about 5% to about 40%.

5. The composition of claim 1 wherein, said resin is present from about 10% to about 30%, said boron material is present from about 20% to about 45%, said carrier fluid is present from about 8% to about 20%.

6. The composition of claim 5 further characterized in that, said drying agent is present from about 5% to about 25% and is comprised of methyl alcohol.

7. The composition of claim 5 further characterized in that, said nonionic surfactant is present from about 1/20% to about 6% by weight.

8. A composition, suitable for use in forming a coating on metal surfaces to selectively prevent carburization thereof in gas carburizing, pack carburizing, and carbonitriding mediums, said composition comprising in weight percent,
    (a) about 15% to about 70% of at least one boron material selected from the group consisting of boric acid, boron oxide, or borax,
    (b) about 3% to about 65% on an active resin basis of water reducible polyester resin
        said resin having a set time of less than about 8 hours, and a cure temperature from about 32° to about 120° F.,
    (c) about 2% to about 60% of water as a carrier fluid for the composition,
    (d) 1/20% to about 12% of a nonionic surfactant material,
    (e) zero to about 20% of thickening agent, and
    (f) zero to about 25% of drying agent,
        said composition exhibiting a property of being capable of being washed off with water after it is applied and used as a stop-off composition.

References Cited

UNITED STATES PATENTS

| 2,485,176 | 10/1949 | Waterfall | 148—22 |
| 2,898,253 | 8/1959 | Schneider et al. | 148—22 |
| 2,992,960 | 7/1961 | Leeg et al. | 260—37 |
| 3,178,321 | 4/1965 | Satterfield | 117—132 |
| 3,178,322 | 4/1965 | Schneider | 148—22 |
| 3,214,400 | 10/1965 | Silver | 260—29.2 |
| 3,318,556 | 5/1967 | Vasiloff et al. | 260—22 |
| 3,437,617 | 4/1969 | Bogle | 260—22 |
| 3,454,433 | 7/1969 | Mueller | 148—22 |

FOREIGN PATENTS

| 890,541 | 3/1962 | Great Britain | 148—22 |

OTHER REFERENCES

H. Schlosser, Coating With Condursal 0090, Zeitschrift Für Wirtschaftliche Fertigung, vol. 62, Sept. 9, 1967, pp. 453—457.

DONALD E. CZAJA, Primary Examiner

R. W. GRIFFIN, Assistant Examiner

U.S. Cl. X.R.

117—46 CC, 161 K, Dig. 10; 148—16.5, 19, 22; 260—13, 16, 29.2 E, 29.2 R

UNITED STATES PATENT OFFICE
CERTIFICATE OF CORRECTION

Patent No. 3,661,820                    Dated May 9, 1972

Inventor(s) Robert W. Foreman and Jon S. Pontius

It is certified that error appears in the above-identified patent and that said Letters Patent are hereby corrected as shown below:

Column 1, line 48, first word "capabiilty" should be --capability--.

Column 1, line 53, "follow" should be --allow--.

Column 3, line 51, "which in" should be --wherein--.

Column 5, claim 1, line 21, "set of time" should be --set time of--.

Signed and sealed this 24th day of October 1972.

(SEAL)
Attest:

EDWARD M. FLETCHER, JR.　　　　　　　ROBERT GOTTSCHALK
Attesting Officer　　　　　　　　　　　Commissioner of Patents